United States Patent [19]

Monaghan et al.

[11] 4,336,977
[45] Jun. 29, 1982

[54] CRIMPED CONNECTOR ASSEMBLY FOR FIBER OPTIC CABLES

[75] Inventors: Kevin J. Monaghan, Middlebury; Russell C. Schwickert, Newtown, both of Conn.

[73] Assignee: Bunker Ramo Corporation, Oak Brook, Ill.

[21] Appl. No.: 190,279

[22] Filed: Sep. 24, 1980

Related U.S. Application Data

[63] Continuation of Ser. No. 939,519, Sep. 5, 1978, abandoned.

[51] Int. Cl.³ .............................................. G02B 5/14
[52] U.S. Cl. ............................ 350/96.20; 350/96.23; 339/97 C; 339/104; 339/276 R; 174/84 C
[58] Field of Search ............... 350/96.20, 96.21, 96.22, 350/96.23; 29/630 A; 174/84 C; 339/95 A, 97 C, 104, 276 R, 276 S

[56] References Cited

U.S. PATENT DOCUMENTS

| | | | |
|---|---|---|---|
| 3,103,548 | 9/1963 | Concelman | 174/89 |
| 3,184,706 | 5/1965 | Atkins | 339/276 R X |
| 3,196,382 | 7/1965 | Morello | 339/276 R X |
| 3,499,101 | 3/1970 | Forney et al. | 174/75 |
| 3,646,502 | 2/1972 | Hutter et al. | 339/89 C |
| 3,655,275 | 4/1972 | Seagraves | 350/320 |
| 3,699,651 | 10/1972 | Rueger et al. | 29/630 A |
| 3,710,005 | 1/1973 | French | 174/89 |
| 3,757,278 | 9/1973 | Schumacher | 339/177 R |
| 3,883,681 | 5/1975 | Campbell | 350/96.20 X |
| 3,914,014 | 10/1975 | James | 339/104 |
| 3,972,585 | 8/1976 | Dalgleish et al. | 350/96.21 |
| 3,982,060 | 9/1976 | Avery et al. | 174/75 C |
| 3,995,930 | 12/1976 | Herrmann | 339/143 R |
| 4,008,948 | 2/1977 | Dalgleish et al. | 350/96.21 |
| 4,023,886 | 5/1977 | Nakayama et al. | 350/96.23 |
| 4,027,938 | 6/1977 | Lewis | 350/96.22 |
| 4,047,788 | 9/1977 | Forney et al. | 339/177 R |
| 4,047,797 | 9/1977 | Arnold et al. | 350/96.20 |
| 4,073,050 | 2/1978 | Kloots | 29/450 |
| 4,076,379 | 2/1978 | Chouinard | 350/96.22 |
| 4,081,208 | 3/1978 | Meade | 350/96.20 |
| 4,097,129 | 6/1978 | Wellington et al. | 350/96.15 |

FOREIGN PATENT DOCUMENTS

| | | |
|---|---|---|
| 2524845 | 12/1975 | Fed. Rep. of Germany . |
| 2613010 | 10/1976 | Fed. Rep. of Germany . |
| 2531994 | 2/1977 | Fed. Rep. of Germany . |
| 2555232 | 6/1977 | Fed. Rep. of Germany . |
| 2616876 | 10/1977 | Fed. Rep. of Germany . |
| 2273289 | 12/1975 | France ............................ 350/96.21 |
| 2367296 | 5/1978 | France . |
| 1149588 | 4/1969 | United Kingdom . |
| 1152135 | 5/1969 | United Kingdom . |
| 1356474 | 6/1974 | United Kingdom . |
| 1467750 | 3/1977 | United Kingdom . |
| 1478134 | 6/1977 | United Kingdom . |
| 1511988 | 5/1978 | United Kingdom . |
| 1545302 | 5/1979 | United Kingdom . |
| 1549928 | 8/1979 | United Kingdom . |

OTHER PUBLICATIONS

Cablewave Systems Inc., *Fiber Optic Connectors (Preliminary Data Sheet)*, No. 57B, Mar. 1978, 2 pp.
American Pamcor, Inc. Literature.

*Primary Examiner*—John D. Lee
*Assistant Examiner*—Frank Gonzalez
*Attorney, Agent, or Firm*—Nicholas A. Camasto; John R. Hoffman

[57] ABSTRACT

A connector assembly is disclosed for crimping onto a fiber optic cable or the like which has one or more single optical fibers and a strength member surrounding the optical fibers. A connector body is provided for receiving the optical fibers of the cable and has a rear end portion over which the strength member of the cable is positionable. The rear end portion of the connector body is provided with one or more annular crimp receiving, generally V-shaped peripheral grooves. A ferrule member is positionable over the grooved rear end portion of the connector body for crimping the strength member between the ferrule member and the connector body. The ferrule member is crimped to have one or more generally V-shaped crimping ribs which are nested in the grooves of the connector body clamping the strength member therebetween. The included angle of each of the V-shaped grooves of the connector body is smaller than that of the V-shaped ribs of the ferrule member so as to increase the number of crimping diameters between the connector body and the ferrule member. In one form of the invention, the rear end portion of the connector body has a transverse abutment surface for engaging the end of a jacket of the fiber optic cable providing an interface between the cable and the connector body.

29 Claims, 5 Drawing Figures

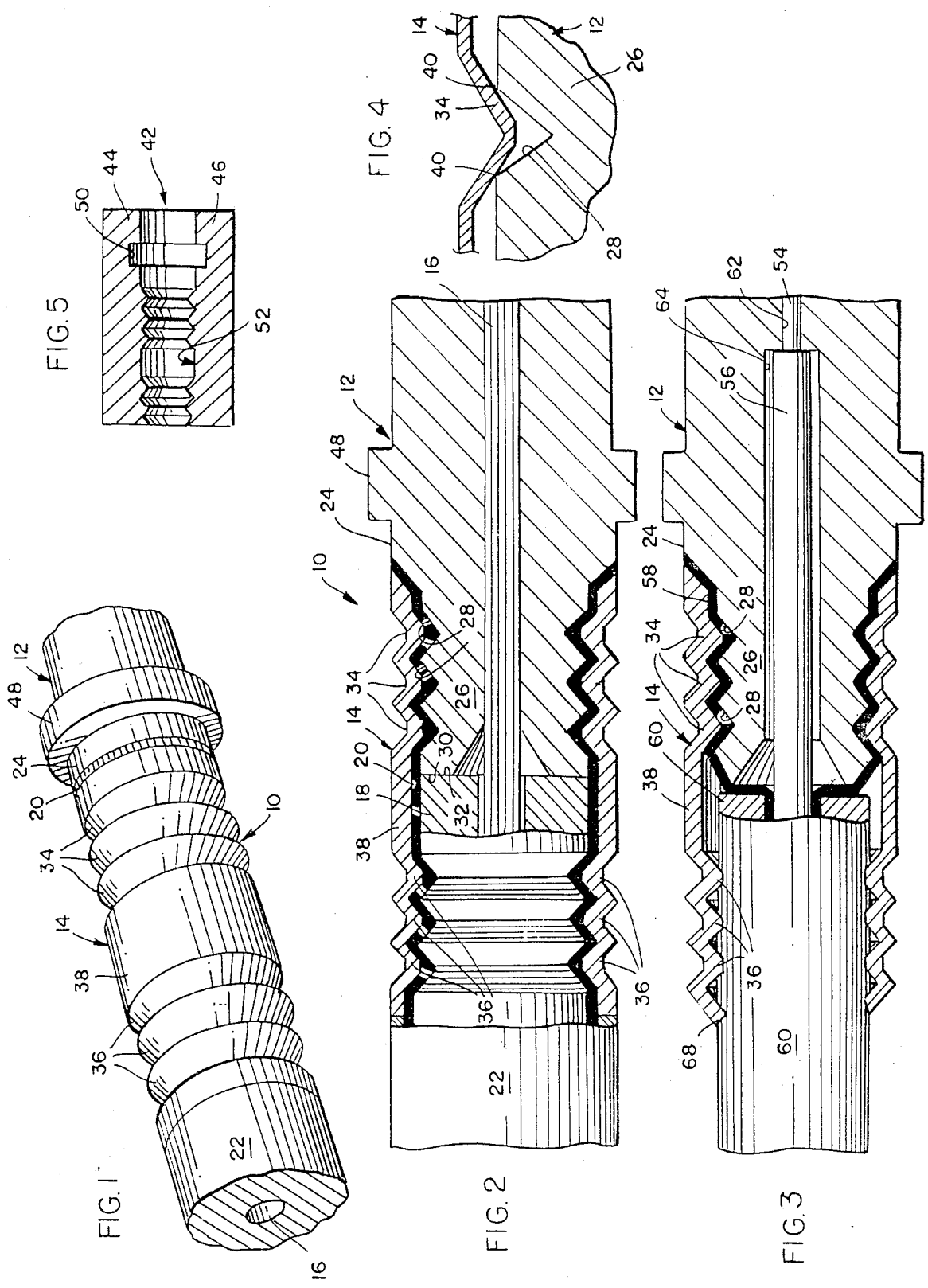

CRIMPED CONNECTOR ASSEMBLY FOR FIBER OPTIC CABLES

The Government has rights in this invention pursuant to Contract No. N66001-78-C-0034 awarded by the Department of the Navy.

This is a continuation application of Ser. No. 939,519, filed Sep. 5, 1978, now abandoned.

BACKGROUND OF THE INVENTION

The present invention relates generally to fiber optics and, more particularly, to a fiber optic connector assembly for a fiber optic cable having one or more single optical fibers therein.

Fiber optic cables generally include one or more single optical fibers and are generally fragile in nature in contrast to electrical cables. Crimping has been widely accepted as one method of terminating an electrical cable to a contact or to a connector assembly because of the reliability of this type of termination as well as the inexpensive nature of the crimping operation itself. For these reasons, it is highly desirable to provide for crimping of fiber optic cables for termination to contacts or connector assemblies. The difference, with regards to crimping, between fiber optic cables and electrical cables is that in an electrical cable the contact or the connector assembly is directly crimped to the conductor itself. In a fiber optic cable, the crimping is done to one or more strength members which usually surround the optical fibers on the inside or outside of a jacket of the cable. This requires the addition of a separate component, namely a crimping ferrule, for crimping the strength member between the ferrule and a body member of the contact or connector assembly so that the one or more single optical fibers of the fiber optic cable are not over-stressed or damaged during termination or during handling of the fiber optic cable after it has been assembled to the connector. This invention provides an improved crimping means in the form of a connector assembly which increases the crimping diameters between the ferrule member and the connector body while also accommodating the additional thickness or the ferrule member permitting sealing and enhancing field termination.

SUMMARY OF THE INVENTION

Accordingly, a principal object of the present invention is to provide a new and improved connector assembly for one or more single optical fibers of a fiber optic cable or the like which has one or more strength members therein.

Another object of the invention is to provide a new and improved connector assembly for fixing the relationship between the strength members of a fiber optic cable and the fiber optic contacts terminated to the fibers thereof so that the terminated fibers can be readily assembled to the connector assembly without over-stressing the fibers.

A further object of the invention is to provide a connector assembly of the character described which increases the number of crimping diameters between the connector body of the connector assembly and the ferrule member without increasing the dimensions thereof.

Still another object of the invention is to provide a connector assembly of the character described which accommodates the additional thickness of the ferrule member to provide a uniformly dimensioned assembly for field termination.

In the embodiment of the invention disclosed herein, a connector assembly is disclosed for one or more single optical fibers of a fiber optic cable or the like which has a strength member therein. A connector body is provided for receiving the one or more single optical fibers of the fiber optic cable. The connector body has a rear end portion over which the strength member of the fiber optic cable is positionable. The rear end portion of the connector body is provided with one or more annular crimp receiving, generally V-shaped grooves which have annular edges about the peripheries of the grooves. A ferrule member is positionable over the grooved rear end portion of the connector body for crimping the strength member between the ferrule member and the grooved rear end portion of the connector body. The ferrule member is crimped to have one or more generally V-shaped crimping ribs nested in the grooves of the connector body. The included angle of each of the V-shaped grooves is smaller than that of the V-shaped ribs of the ferrule member so as to increase or double the number of crimping diameters between the connector body and the ferrule member, namely along the edges of the grooves.

The connector body has a larger diameter portion adjacent a smaller diameter rear end portion, the latter being provided with the generally V-shaped grooves. The outside diameter of the ferrule member is substantially the same as that of the larger diameter portion of the connector body so as to be generally flush therewith.

In one form of the invention, the fiber optic cable has an inner jacket surrounding the one or more single optical fibers, with the strength member surrounding the inner jacket and extending beyond the jacket. The rear end portion of the connector body has a transverse abutment surface for engaging the end of the jacket providing an interface between the cable and the connector body. The ferrule member has a second crimping portion for crimping onto the outside of the strength member rearwardly of the interface between the inner jacket and the connector body. The cable has a second or outer jacket surrounding the strength member, and the rear end of the ferrule member is provided with a transverse abutment surface for engaging the end of the outer jacket of the cable providing a second interface between the cable and the connector assembly.

In another embodiment of the invention, the fiber optic cable has a jacket surrounding both the strength member and the one or more single optical fibers of the fiber optic cable, and the ferrule member has a second crimping portion for crimping onto the outside of the jacket of the cable.

Other objects, features and advantages of the invention will be apparent from the following detailed description taken in connection with the accompanying drawings.

DESCRIPTION OF THE DRAWINGS

FIG. 1 is a fragmented perspective view of the connector assembly of the present invention terminated to a fiber optic cable;

FIG. 2 is a fragmented vertical sectional view, on an enlarged scale, of the connector assembly of the present invention, terminated to the end of one form of a fiber optic cable;

FIG. 3 is a view similar to that of FIG. 2 with the connector assembly of the present invention terminated to the end of another form of fiber optic cable;

FIG. 4 is an enlarged, somewhat schematic sectional view through a single crimp receiving groove of the connector body and an aligned crimping rib of the ferrule member of the connector assembly of the present invention; and FIG. 5 is a vertical sectional view of a split die set for crimping the connector assembly of the present invention onto a fiber optic cable.

DETAILED DESCRIPTION OF THE INVENTION

Referring to the drawings in greater detail, a connector assembly in accordance with the present invention is generally designated 10 and is provided for use with a fiber optic cable or the like which has one or more single optical fibers and a strength member, as described in greater detail hereinafter. The connector assembly of the present invention is designed for crimping the strength member of the fiber optic cable so as to concentrate any stresses on the cable to the strength member rather than the fragile optical fibers during termination of the fibers or during assembly and field handling of the cable. More particularly, the connector assembly 10 of the present invention includes a connector body, generally designated 12, for receiving one or more single optical fibers of the fiber optic cable (described in greater detail hereinafter), and a ferrule member, generally designated 14.

Referring specifically to FIG. 2, the fiber optic cable shown therein includes a fiber bundle 16 formed of a plurality of single optical fibers. The fiber bundle 16 is surrounded by an inner jacket 18, and the inner jacket 18 is surrounded by a strength member 20 which extends beyond the end of the inner jacket. The cable further includes an outer jacket 22 which surrounds the strength member 20, but the cable is cut so that the strength member 20 as well as the inner jacket 18 extend beyond the outer jacket 22, as shown.

The connector body 12 shown in FIG. 2 includes a larger diameter portion 24 and a smaller diameter rear end portion 26 over which the strength member 20 of the fiber optic cable is positioned. The rear end portion 26 of the connector body 12 is provided with a plurality of annular crimp receiving, generally V-shaped peripheral grooves 28. The rear end portion 26 of the connector body 12 further is provided with a transverse abutment surface 30 for engaging the end 32 of the inner jacket 18 of the cable providing an interface between the cable and the connector body when the cable is terminated thereto.

The ferrule member 14 of the connector assembly 10 shown in FIG. 2 has a first crimping portion which is defined by a plurality of generally V-shaped crimping ribs 34 which are alignable with the grooves 28 of the connector body 12. The strength member 20 of the fiber optic cable is crimped or clamped between the connector body 12 and the ferrule member 14 in the area of the grooves 28 and the ribs 34 of the body and ferrule, respectively. The ferrule member 14 further includes a second crimping portion defined by a plurality of ribs 36 formed on the ferrule member rearwardly of the crimping ribs 34 and separated therefrom by a straight intermediate portion 38 of the ferrule member. The ribs 36 of the ferrule member 14 are provided for crimping onto the outside of the strength member 20 of the fiber optic cable rearwardly of the interface as at 30, 32 between the connector body 12 and the inner jacket 18 of the cable.

The outside diameter of the ferrule member 14 is the same as that of the larger diameter portion 24 of the connector body 12 so as to avoid any irregularities and facilitate use of the connector assembly with standard rear release insertion/withdrawal field operation tools. Furthermore, the outside diameter of the ferrule member 14 adjacent the outer jacket 22 of the fiber optic cable preferably is the same as the outside diameter of the cable so as to avoid any irregularities at the juncture of the outer jacket 22 and the ferrule member 14.

Referring to FIG. 4, an enlarged, somewhat schematic sectional view is presented which is taken through a single crimp receiving groove 28 of the rear end portion 26 of the connector body 12. The groove 28 is shown aligned with a single rib 34 of the ferrule member 14 with the strength member 20 of the fiber optic cable removed to facilitate the illustration. In accordance with the present invention, the included angle of each of the grooves 28 is smaller than that of the corresponding rib 34 so as to increase the number of crimping diameters between the connector body 12 and the ferrule member 14. More specifically, by so dimensioning the grooves 28 and the ribs 34, the crimping areas of contact between the connector body 12 and the ferrule member 14 is along the edges of the grooves 28, as at 40 in FIG. 4, so that this dimensioning is effective to double the crimping diameters between the connector body and the ferrule member. Not only are the crimping diameters increased, but slippage of the strength member 20 is practically eliminated. It further should be pointed out that although the crimp receiving grooves 28 of the connector body 12 and the crimping ribs 34 of the ferrule member 14 are described at various times herein as being generally V-shaped, such descriptions in the specification and claims hereof are intended to include any such concave grooves and convex ribs which are so dimensioned as to provide the multiple areas of crimping contacts or diameters along the edges of the grooves, as facilitated by the dimensioning described above. The use of the term "V-shaped" in the specification and claims herein is to facilitate the illustration but in no way to limit the description and claims.

Referring to FIG. 5, a crimping die, generally designated 42, is shown to include a split die set comprising an upper die 44 and a lower die 46. The connector body 12 is provided with an annular, generally rectangular rib 48 (FIGS. 2 and 3) which is positionable within a complementary generally rectangularly shaped groove 50 of the die set to facilitate positioning of the connector body within the die. Each of the dies 44 and 46 is provided with an interior cavity, generally designated 52, which is provided with grooves and ribs so as to form the crimping ribs 34 and 36 of the ferrule member 14 during a crimping operation to terminate the fiber optic cable to the connector assembly 10. The ferrule member, prior to positioning into the crimping die, is tubular in the area of the crimping ribs 34 and 36, and the ribs are formed or crimped into the grooves 28 of the connector body during crimping operation of the die 42.

Referring to FIG. 3, the fiber optic cable shown therein includes a single optical fiber 54 surrounded by an inner jacket 56 which is surrounded by a strength member 58 which, in turn, is surrounded by an outer jacket 60. Like numerals are applied to the connector body 12 and the ferrule member 14 in FIG. 3 which correspond to similar components thereof as described in relation to FIGS. 2 and 4. However, the connector body shown in FIG. 3 has a smaller diameter bore portion 62 for receiving a single optical fiber 54 and a larger diameter bore portion 64 for receiving the inner jacket 56 of the fiber optic cable.

The connector body 12 shown in FIG. 3 does not include the transverse abutment surface 30 as described in relation to the connector body shown in FIG. 2. As with the fiber optic cable shown in FIG. 2, the strength member 58 of the cable shown in FIG. 3 is positioned over the rear end 26 of the connector body 12 overlying the crimping grooves 28 formed therein. The ribs 34 of the ferrule member 14 are crimped so as to be nested in the grooves 28 and are dimensioned as described above in relation to FIG. 4.

With the fiber optic cable shown in FIG. 3, the strength member 58 flares radially outwardly adjacent the end of the outer jacket 60 of the cable and protrudes forwardly therefrom so as to be sandwiched between the rear end portion 26 of the connector body 12 and the ferrule member 14 and is crimped therebetween. The larger diameter portion 24 of the connector body 12 and the adjacent outside diameter of the ferrule member 14 are generally the same so as to avoid any irregularities as described above. The ferrule member 14 is crimped to the outside of the outer jacket 60 of the cable by the crimping ribs 36 rearwardly of the connector body 12. Preferably, the extreme rear or inner end of the ferrule member 14 is crimped as at 68, so as to bear inwardly in gripping or biting engagement against the outside of the fiber optic cable.

While in the foregoing specification a detailed description of the invention has been set forth for purposes of illustration, variations of the details herein given may be made by those skilled in the art without departing from the spirit and scope of the invention as set forth in the appended claims.

I claim:

1. A connector assembly for one or more single optical fibers of a fiber optic cable or the like which has a strength member therein, comprising:
   a connector body for receiving said one or more single optical fibers of the fiber optic cable, said connector body having a rear end portion over which the strength member of said fiber optic cable is positionable, said rear end portion being provided with one or more annular crimp receiving grooves;
   a ferrule member positionable over the grooved rear end portion of said connector body for crimping said strength member between the ferrule member and the grooved rear end portion of said connector body, said ferrule member having one or more ribs nested in the grooves of said connector body after crimping, and wherein
   each of said grooves cooperates with one of said ribs to provide a plurality of crimping diameters therebetween.

2. The connector assembly of claim 1 for use with a fiber optic cable having a jacket surrounding said one or more single optical fibers, and wherein the rear end portion of said connector body has a transverse abutment surface for engaging the end of said jacket providing an interface between the cable and the connector body.

3. The connector assembly of claim 2 wherein said ferrule member is of a length so as to extend over said cable.

4. The connector assembly of claim 3 wherein said ferrule member has a crimping portion for crimping onto said cable rearwardly of said grooves.

5. The connector assembly of claim 4 wherein said ferrule member has a first portion defining said crimping ribs after crimping, a second portion defining said crimping portion after crimping, and an intermediate portion between said first and second portions overlying said interface.

6. The connector assembly of claim 1 for use with a fiber optic cable having a jacket surrounding said one or more single optical fibers and said strength member with the cable cut so that the strength member extends beyond the jacket, and wherein said ferrule member is of a length so as to extend over said jacket.

7. The connector assembly of claim 6 wherein said ferrule member has a crimping portion for crimping onto said jacket.

8. The connector assembly of claim 7 wherein said ferrule member has a first portion defining said crimping ribs after crimping and a second portion defining said crimping portion after crimping.

9. The connector assembly of claim 1 for use with a fiber optic cable having a jacket surrounding said one or more single optical fibers, and wherein said ferrule member is of a length so as to extend over said jacket.

10. The connector assembly of claim 9 wherein said ferrule member has a crimping portion for crimping onto said cable rearwardly of said grooves.

11. The connector assembly of claim 1 wherein said connector body has a larger diameter portion and a smaller diameter rear end portion provided with said grooves, the outside diameter of said ferrule member being substantially the same as the outside diameter of said larger diameter portion of said connector body.

12. The connector assembly of claim 1 for use with a fiber optic cable having a jacket surrounding said one or more single optical fibers and said strength member with the cable cut so that the strength member extends beyond the jacket, and wherein said ferrule member has a crimping portion for crimping onto said cable rearwardly of said grooves.

13. The connector assembly of claim 1 for use with a fiber optic cable having a jacket surrounding said one or more single optical fibers and said strength member with the cable cut so that the strength member extends beyond the jacket, said ferrule member having a rear end portion defining a transverse abutment surface for engaging the end of said jacket providing an interface between the cable and the connector body.

14. The connector assembly of claim 1 for use with a fiber optic cable having a jacket surrounding said one or more single optical fibers with the cable cut so that the strength member extends beyond the jacket, the outside diameter of said ferrule member being substantially the same as the outside diameter of said jacket.

15. The connector assembly of claim 1 wherein said crimp receiving grooves and said crimping ribs are generally V-shaped and wherein the included angle of each of said V-shaped grooves is smaller than that of said V-shaped ribs so as to increase the number of crimping diameters between the connector body and the ferrule member.

16. A connector assembly for one or more single optical fibers of a fiber optic cable or the like which has a strength member within and a jacket surrounding said one or more single optical fibers and said strength member, with the strength member extending beyond the jacket, comprising:

a connector body for receiving said one or more single optical fibers of the fiber optic cable, said connector body having a rear end portion over which the strength member of said fiber optic cable is positionable, said rear end portion being provided with one or more crimp receiving grooves; and a ferrule member positionable over the rear end portion of said connector body and including a first crimping portion for crimping the strength member between the ferrule member and said connector body and a second crimping portion for crimping into said jacket rearwardly of said connector body and said ferrule member having one or more crimping ribs nested in the crimp receiving grooves of said connector body after crimping.

17. A connector assembly for one or more single optical fibers of a fiber optic cable or the like which has a strength member therein, comprising:

a connector body for receiving said one or more single optical fibers of the fiber optic cable, said connector body having a rear end portion over which the strength member of said fiber optic cable is positionable, said rear end portion being provided with one or more peripheral crimp receiving grooves defining edges along opposite sides of the grooves;

a ferrule member positionable over the grooved rear end portion of said connector body for crimping said strength member between the ferrule member and the rear end portion of said connector body, said ferrule member having one or more crimping ribs nested in the grooves of said connector body after crimping; and wherein said peripheral grooves on the rear end portion of said connector body are smaller than said ribs of said ferrule member so that the strength member of said fiber optic cable is crimped primarily between the ribs of said ferrule member and the edges of said grooves to increase the number of crimping diameters between the connector body and the ferrule member.

18. A connector assembly for one or more single optical fibers of a fiber optic cable or the like which has a strength member surrounding said one or more single optical fibers and a jacket surrounding said strength member and said one or more single optical fibers, with the strength member extending beyond said jacket, comprising:

a connector body for receiving said one or more single optical fibers of said fiber optic cable, said connector body having a rear end portion over which the strength member of said fiber optic cable is positionable, said rear end portion being provided with one or more annular crimp receiving grooves;

a ferrule member positionable over the grooved rear end portion of said connector body for crimping said strength member between the ferrule member and the rear end portion of said connector body, said ferrule member having one or more crimping ribs nested in the grooves of said connector body after crimping; and wherein said grooves on the rear end portion of said connector body are smaller than said ribs of said ferrule member.

19. The connector assembly of claim 18 wherein said ferrule member has a second crimping portion for crimping into the outside of the jacket of said fiber optic cable beyond said connector body.

20. The connector assembly of claim 18 wherein said connector body has a larger diameter portion and a smaller diameter rear end portion provided with said crimping grooves, the outside diameter of said ferrule member being substantially the same as the outside diameter of said larger diameter portion of said connector body.

21. A connector assembly for one or more single optical fibers of a fiber optic cable or the like which has a jacket surrounding said one or more single optical fibers and a strength member surrounding said jacket, with the strength member extending beyond said jacket, comprising:

a connector body for receiving said one or more single optical fibers of the fiber optic cable, said connector body having a rear end portion over which the strength member of said fiber optic cable is positionable, said rear end portion being provided with one or more annular crimp receiving grooves;

a ferrule member positionable over the grooved rear end portion of said connector body for crimping said strength member between the ferrule member and the rear end portion of said connector body, said ferrule member having one or more crimping ribs nested in the grooves of said connector body after crimping; and said rear end portion of said connector body having a transverse abutment surface at the rearward most point of said rear end portion, the forward most end of said jacket engaging said transverse abutment surface to provide an interface between the cable and the connector body, said ferrule extending rearwardly of said transverse abutment surface.

22. The connector assembly of claim 21 wherein said ferrule member includes a crimping portion for crimping into the outside of said strength member rearwardly of said connector body.

23. The connector assembly of claim 21 wherein said connector body has a larger diameter portion adjacent said rear end portion, the outside diameter of said ferrule member being substantially the same as the outside diameter of said larger diameter portion of said connector body.

24. The connector assembly of claim 23 wherein each of said crimp receiving grooves is smaller than the respective aligned rib of said ferrule member so as to increase the number of crimping diameters between the connector body and the ferrule member, the crimping diameters being located generally along the edges of the grooves.

25. The connector assembly of claim 23 wherein said connector body has a larger diameter portion and a smaller diameter rear end portion provided with said crimp receiving grooves, the outside diameter of said ferrule member being substantially the same as the outside diameter of said larger diameter portion of said connector body.

26. The connector assembly of claim 23 wherein said ferrule member has a second crimping portion for crimping into said strength member rearwardly of said connector body.

27. The connector assembly of claim 23 for use with a fiber optic cable having a second jacket surrounding said strength member, with the strength member extending beyond the jacket, said ferrule member having a transverse rear abutment surface for engaging the end of said second jacket providing an interface between the cable and the ferrule member.

28. The connector assembly of claim 27 wherein the outside diameter of said ferrule member adjacent the end of the second jacket of said fiber optic cable is substantially the same as the outside diameter of the jacket.

29. A connector assembly for one or more single optical fibers of a fiber optic cable or the like which has a strength member therein, and a jacket surrounding said strength member and said one or more single optical fibers, with the strength member extending beyond the jacket, comprising:

a connector body for receiving said one or more single optical fibers of the fiber optic cable, said connector body having a rear end portion over which the strength member of said fiber optic cable is positionable, said rear end portion being provided with one or more crimp receiving grooves;

a ferrule member positionable over the rear end portion of said connector body for crimping said strength member between the ferrule member and the rear portion of said connector body, said ferrule member having one or more crimping ribs nested in the grooves of said connector body after crimping; and wherein the outside diameter of said ferrule member adjacent the jacket of said fiber optic cable is no larger than the outside diameter of said jacket.

* * * * *